United States Patent [19]

Jones

[11] Patent Number: 5,319,732

[45] Date of Patent: Jun. 7, 1994

[54] SUBMARINE REPEATERS AND OPTICAL FIBER STORAGE MEANS THEREIN

[75] Inventor: Richard K. Jones, Bishop's Stortford, United Kingdom

[73] Assignee: Northern Telecom Limited, Montreal, Canada

[21] Appl. No.: 39,970

[22] Filed: Mar. 30, 1993

[30] Foreign Application Priority Data

Apr. 2, 1992 [GB] United Kingdom ................. 9207215

[51] Int. Cl.⁵ .............................................. G02B 6/42
[52] U.S. Cl. ..................................... 385/135; 385/134; 385/136
[58] Field of Search ................ 385/134, 135, 136, 138

[56] References Cited

U.S. PATENT DOCUMENTS

| | | | |
|---|---|---|---|
| 4,709,980 | 12/1987 | Coll et al. | 385/135 |
| 5,024,498 | 6/1991 | Becker et al. | 385/134 |
| 5,189,724 | 2/1993 | Hartley | 385/135 |

Primary Examiner—Rodney B. Bovernick
Assistant Examiner—Stephen W. Barns
Attorney, Agent, or Firm—Lee, Mann, Smith, McWilliams, Sweeney & Ohlson

[57] ABSTRACT

In a submarine repeater for a fibre optical transmission system, the cable and tail fibres at the A and B ends of the repeater are accommodated in storage structures. Each structure comprises two bodies 12, 13 (FIG. 1) having circular surface grooves or channels 125, 135 in which respective cable or tail fibres are stored. Straight channels 126, 136 provide communication between the circular channels and accommodate splices between the fibres stored therein.

5 Claims, 2 Drawing Sheets

SUBMARINE REPEATERS AND OPTICAL FIBER STORAGE MEANS THEREIN

This invention relates to opto-electronic repeaters e.g. for submarine transmission systems, and in particular to arrangements for handling optical fibres within a repeater.

The purpose of an optical repeater is to regenerate the signals in a cable transmission system, e.g. a submarine system. Where the cable enters the repeater housing the individual optical fibres need to be joined to the tail fibres of opto-electronic devices such as photodetectors for detecting the signal prior to amplification. Similarly at the other end of the repeater the optical fibres of the outgoing cable need to be connected to the optical fibre tails of the output opto-electronic devices such as infra-red semiconductor lasers.

Within the repeater, the regenerator circuitry and the opto-electronic devices need to be protected against the outside environment and therefore the repeater normally comprises a pressure resisting casing and bulkheads sealed to the casing at either end. Where the optical fibres from the cable pass through the bulkheads, there are glands which seal the fibres through the bulkhead.

Between the bulkhead and the regenerator circuitry for example there will be the need to store excess lengths of fibre and the splices between the fibres sealed through the glands on the one hand and the tail fibres from the opto-electronic devices on the other hand. The excess fibre is required to allow for a number of attempts at effecting splices between fibres, whereby to provide a transmission path between the cable and the regenerator circuitry.

In the past these splices and the excess lengths of fibre have been stored together on an axially extending spool having for example a soft outer layer around which the fibres and splices are laid in helical fashion. In such repeaters the spool around which the fibres are wound acts as a cover around a semi-rigid coupling which couples the regenerator's chassis to the bulkheads.

In the past the assembly procedure would consist of wrapping the fibres around the storage spool and marking splice positions while the fibre glands are mounted in a dummy bulkhead. The glands are removed from the dummy bulkheads and are inserted into the bulkhead intended for use in the finished repeater, and the fibres are then re-wrapped around the spool ready for splicing. The splices are then made and these splices laid on to the soft surface of the spool.

Previous systems have required a small number of fibres e.g. four fibres per cable and wrapping these fibres in common around the same spool has not proved to be difficult.

It is now proposed to incorporate more fibres in the transmission system, for example eight fibres or more, and this previous storage arrangement will not prove satisfactory for such a large number of fibres and splices since there is a high potential risk of damage to the fibres.

One approach to this problem is described in our UK specification No. 2 233 211A (S. J. Gandy 1) which describes a repeater internal unit assembly having at either end a fibre storage facility comprising a plurality of spools, one for each fibre. Although this arrangement effectively addresses the problem of storage of a large number of fibres, it comprises a large number of piece parts and has thus proved costly both in manufacture and assembly.

The object of the invention is to provide a repeater having an improved fibre storage arrangement.

According to the invention there is provided an optical fibre storage arrangement for a telecommunications repeater whereby to provide an interface between a telecommunications cable and regeneration means, the storage arrangement including a first generally cylindrical body having a plurality of first circular surface grooves one for each fibre of said cable and within which a plurality of turns of that fibre are accommodated, a second generally cylindrical body having a plurality of second circular surface grooves one for each said first groove and each accommodating a plurality of turns of a respective tail fibre associated with the regeneration means, further surface grooves in said first and second bodies each providing communication between respective first and second circular grooves and accommodating a splice between the fibres stored in those grooves, and casing means for retaining the fibres and splices within the grooves.

An embodiment of the invention will now be described with reference to the accompanying drawings in which.

The terms 'A-end' and 'B-end' relate to the way in which the repeater is assembled. Thus, the various components of the repeater are assembled on the A-end which must therefore be designed to carry the weight of those components. The assembly is then inserted into the repeater housing and is coupled to the B-end bulkhead prior to closure of the housing. In consequence there are differences in mechanical construction between the A-end and B-end of the repeater.

Figure 1:
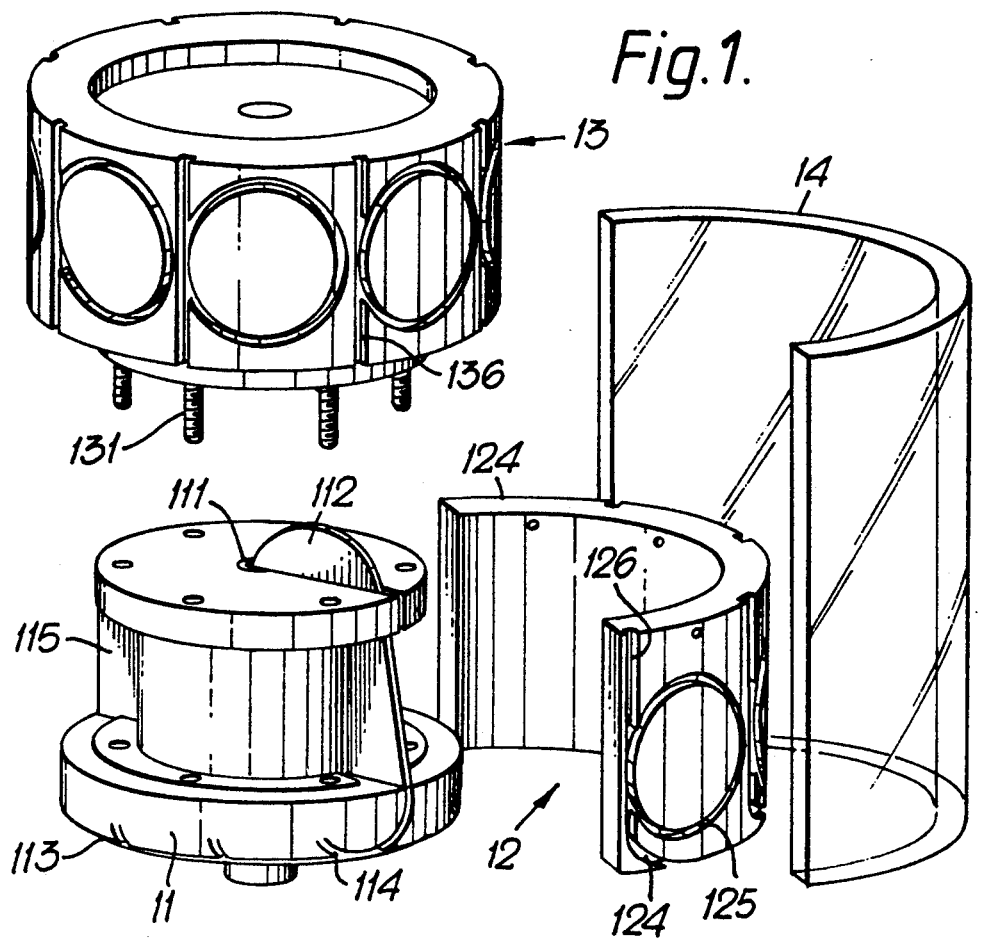
FIG. 1 is an exploded view of a fibre storage arrangement for one end (the 'A' end) of a repeater.
Figure 1A:
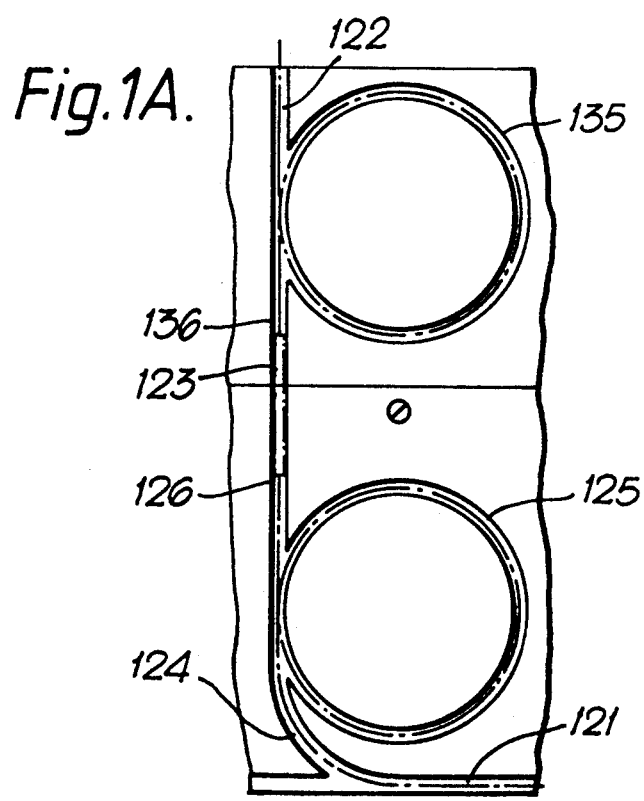
FIG. 1A shows a detail of the arrangement of FIG. 1.

Referring now to FIGS. 1 and 1A, the fibre storage arrangement for the A-end of a repeater is mounted on a bulkhead coupling 11 and comprises a first fibre storage structure or body 12 and a second fibre storage structure or body 13. The first storage structure 12 comprises a pair of half cylindrical shells 12a, 12b which, when affixed to the bulkhead coupling 11, provide a cylindrical surface whose diameter is substantially equal to that of the cylindrical second storage structure 13. The latter structure is secured to the bulkhead coupling 11 via studs 131. Typically the first and second storage structures are formed, e.g. by machining, from a plastics material such as DELRIN.

The bulkhead coupling 11 has a central bore 111 through which the cable fibres 121 (FIG. 1A) are fed and are then carried by a fibre guide on bridge member 112 to a circumferential path defined by a shoulder 113. Individual fibres are led off from this storage path via a plurality of equally spaced arcuate guide grooves or channels 114. The coupling 11 is formed from electrically insulating material whereby to withstand the high voltage supply, typically 2000 volts, from which the repeater is powered. An earthing strap 115 may be provided on the coupling 11.

The grooves 114 communicate with similar grooves 124 formed in the surface of the first support member 12. These grooves 124 lead in turn each to a generally circular groove 125 within which a number of turns of a respective cable fibre may be stored. A similar array of circular grooves 135 is provided on the second storage structure 13 for accommodating tail fibres 122 (FIG. 1A) which are coupled to the regeneration means. Further grooves 126, 136 are provided in the surfaces of the first and second storage structures respectively whereby to provide communication between corresponding circular grooves 125, 135 and to accommodate a splice 123 (FIG. 1A) between the fibres stored within these circular grooves. The fibres are retained within the grooves via a casing comprising a pair of semi-cylindrical shells 14 which shells abut the surfaces of the storage structures 12 and 13. Typically the shells 14 are formed from a transparent plastics material such as a polycarbonate or an acrylic material.

Figure 2:
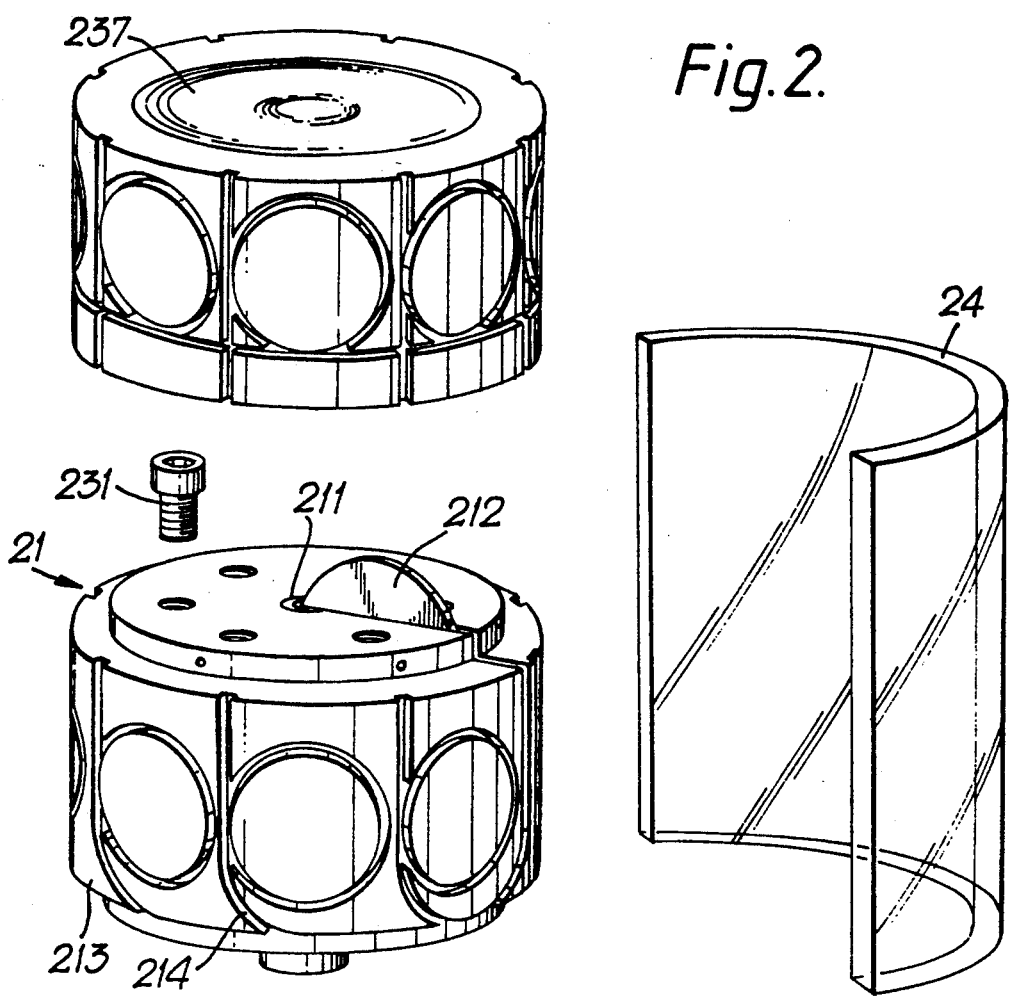
FIG. 2 shows a similar fibre storage arrangement for the other end (the 'B' end) of a repeater.
Figure 2A:
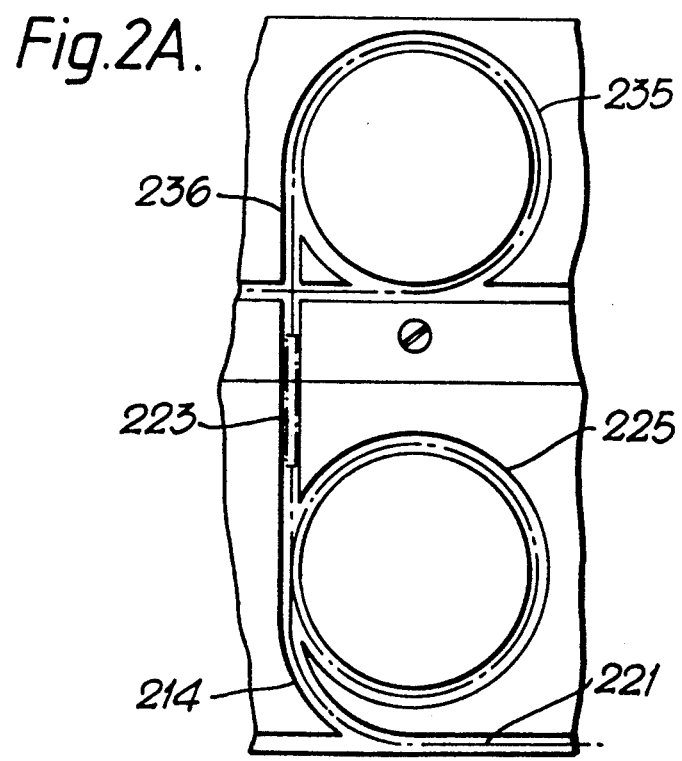
FIG. 2A shows a detail of the arrangement of FIG. 2.

The construction at the B-end of the repeater, shown in FIGS. 2 and 2A, is somewhat similar to that of the A-end. However, in this construction the first storage structure 21 and the bulkhead coupling are conveniently formed as a single structure.

Referring to FIG. 2, the coupling/storage structure 21 has a central bore 211 through which the cable fibres 221 are led and are then carried via a bridge member 212 to a circumferential path defined by shoulder 213. Individual fibres are led from this path via arcuate grooves or channels 214 to circular grooves 225 each of which accommodates a number of turns of a respective cable fibre. Further grooves or channels 226 are provided in register with grooves 236 formed in the surface of the second storage structure 23 and which in turn communicate with circular storage grooves 235. The grooves 235 accommodate each a number of turns of a respective tail fibre 222 and the grooves or channels 226 and 236 together accommodate splices 233 between the cable and tail fibres. The second storage structure 23 may be secured to the coupling/storage structure 21 by set screws 231.

The tail fibres form the storage grooves 235 are coupled to a cable in the form of a flexible coil 237 which in turn is coupled to the regenerator circuitry (not shown). This arrangement allows for axial separation of the repeater components during assembly of the repeater. As before, the fibres are retained in their respective grooves via a casing comprising a pair of semi-cyclindrical shells 24 which shells abut the surfaces of the storage structures 12 and 13.

Advantageously, the end fibre is applied to its respective circular groove by first circuiting an appropriate number of turns of the fibre around a mandrel applied to the surface of the storage structure and then sliding the turns of fibre from the mandrel and into the groove. In some applications the fibre may be retained in the circular groove by the application of a strip (not shown) of plastics foam into the groove.

To effect a splice between fibres from a corresponding pair of circular grooves, one turn of fibre is first removed from each groove. The fibres are then cut to length and the splice is formed. If that splice is unsuccessful it is cut away, a further turn of each fibre is removed from the respective groove and the splicing operation is repeated. When a successful splice has been achieved it is then located in the groove 126, 136 (226, 236) disposed between the circular grooves. When all the splices have been effected in this way, the casing members 14 (24) are applied to the surface of the assembly, to retain the fibres in their respective grooves. Advantageously the casing members are formed from a transparent plastics material to allow visual inspection of the structure prior to final assembly into a tubular metal housing.

I claim:

1. An optical fibre storage arrangement for a telecommunications repeater whereby to provide an interface between a telecommunications cable and regeneration means, the storage arrangement including a first generally cylindrical body having a plurality of first circular surface grooves one for each fibre of said cable and within which a plurality of turns of that fibre are accommodated, a second generally cylindrical body having a plurality of second circular surface grooves one for each said first groove and each accommodating a plurality of turns of a respective tail fibre associated with the regeneration means, further surface grooves in said first and second bodies each providing communication between respective first and second circular grooves and accommodating a splice between the fibres stored in those grooves, and casing means for retaining the fibres and splices within the grooves.

2. An optical fibre storage arrangement as claimed in claim 1, wherein said casing means comprises a mating pair of semi-cylindrical shells disposed in abutment with the surface of the first and second cylindrical bodies whereby to retain the fibres stored in the grooves.

3. An optical fibre storage arrangement as claimed in claim 2, wherein said first and second bodies are formed from a plastics material.

4. An optical fibre storage arrangement as claimed in claim 3, wherein said first cylindrical body is mounted on a bulkhead coupling having an axial bore via which fibres are led from a cable to the first body.

5. A submarine telecommunications repeater provided with an optical fibre storage arrangement for a telecommunications repeater whereby to provide an interface between a telecommunications cable and regeneration means, the storage arrangement including a first cylindrical body having a plurality of first circular grooves one for each fibre of said cable and within which a plurality of turns of that fibre are accommodated, a second cylindrical body having a plurality of second circular surface grooves one for each said first groove and each accommodating a plurality of turns of a respective tail fibre associated with the regeneration means, further surface grooves in said first and second bodies each providing communication between respective first and second circular grooves and accommodating a splice between the fibres stored in those grooves, and casing means for retaining the fibres and splices within the grooves.

* * * * *